United States Patent [19]

Bethell et al.

[11] E Re. 28,593

[45] Reissued Oct. 28, 1975

[54] OXIDATION OF ACROLEIN AND METHACROLEIN WITH A MOLYBDENUM POLYVALENT METAL OXYGEN CATALYST

[75] Inventors: James Robert Bethell, Ewell, England; Edward James Gasson, Dollar, Scotland; David James Hadley, Tadworth, England; Roderick Frank Neale, Midlothian, Scotland

[73] Assignee: BP Chemicals International Limited, London, England

[22] Filed: Dec. 27, 1973

[21] Appl. No.: 428,751

Related U.S. Patent Documents

Reissue of:

[64] Patent No.: 3,435,069
Issued: Mar. 25, 1969
Appl. No.: 493,561
Filed: Oct. 6, 1965

U.S. Applications:

[63] Continuation-in-part of Ser. No. 100,492, April 4, 1961, abandoned.

[30] Foreign Application Priority Data

| | | |
|---|---|---|
| Apr. 14, 1960 | United Kingdom | 11310/60 |
| May 12, 1960 | United Kingdom | 16750/60 |
| Aug. 4, 1960 | United Kingdom | 26993/60 |

[52] U.S. Cl. ..... 260/530 N; 260/531 R; 260/533 N; 252/455 R; 252/456; 252/458; 252/459; 252/464; 252/465; 252/467; 252/469; 252/470

[51] Int. Cl.[2] ..... C07C 51/26; C07C 57/04

[58] Field of Search ..... 260/530 N

[56] References Cited

UNITED STATES PATENTS

| | | | |
|---|---|---|---|
| 2,744,928 | 5/1956 | Smith et al. | 260/530 N |
| 2,881,212 | 4/1959 | Idol et al. | 260/530 N |
| 2,881,213 | 4/1959 | Idol et al. | 260/530 N |
| 2,941,007 | 6/1960 | Callahan et al. | 260/533 N |
| 3,087,964 | 4/1963 | Koch et al. | 260/530 N |

FOREIGN PATENTS OR APPLICATIONS

| | | | |
|---|---|---|---|
| 369,963 | 3/1932 | United Kingdom | 260/530 N |

*Primary Examiner*—Lorraine A. Weinberger
*Assistant Examiner*—Richard D. Kelly
*Attorney, Agent, or Firm*—Brooks Haidt Haffner & DeLahunty

[57] ABSTRACT

*The invention relates to a process for the production of acrylic acid or methacrylic acid by the vapor phase oxidation of acrolein or methacrolein with molecular oxygen in the presence of an oxidation catalyst consisting essentially of (1) a mixture of an oxide of molybdenum and an oxide of a polyvalent metal other than cobalt or (2) a compound of molybdenum, oxygen and a polyvalent metal other than cobalt.*

17 Claims, No Drawings

OXIDATION OF ACROLEIN AND METHACROLEIN WITH A MOLYBDENUM POLYVALENT METAL OXYGEN CATALYST

Matter enclosed in heavy brackets [ ] appears in the original patent but forms no part of this reissue specification; matter printed in italics indicates the additions made by reissue.

This application is a continuation-in-part of our previously filed, copending application Ser. No. 100,492, filed Apr. 4, 1961 now abandoned.

The present invention relates to the production of unsaturated aliphatic acids and particularly to the production of acrylic and methacrylic acids.

In copending application Ser. No. 4,221 filed Jan. 25, 1960 is described the process for the production of acrylic acid or methacrylic acid which comprises reacting at an elevated temperature in the vapour phase acrolein or methacrolein, or a compound which gives rise to acrolein or methacrolein under the reaction conditions, with molecular oxygen over an oxidation catalyst comprising (i) a mixture of the oxides of molybdenum and cobalt, and/or (ii) a compound of molybdenum, cobalt, and oxygen, such as cobalt molybdate.

According to the present invention the process for the production of acrylic acid or methacrylic acid comprises reacting at an elevated temperature in the vapour phase acrolein or methacrolein, or a compound which gives rise to acrolein or methacrolein under the reaction conditions, with molecular oxygen over an oxidation catalyst comprising (i) a mixture of the oxides of molybdenum and a polyvalent metal or metals other than cobalt, and/or (ii) a compound of molybdenum, oxygen and a polyvalent metal or metals other than cobalt.

By the term "polyvalent" is meant having more than one valency state.

The preferred starting material is acrolein, but compounds giving rise to acrolein under the reaction conditions, such as propylene or allyl alcohol, and mixtures of propylene and acrolein, may also be used. Methacrolein may also be used as starting material in the process, and is converted to methacrylic acid. When the starting material is an olefine such as propylene, the reaction product consists of the unsaturated acid with the corresponding unsaturated aliphatic aldehyde. Thus propylene is converted into a mixture of acrylic acid and acrolein.

The catalysts used in the process must include molybdenum, oxygen and a polyvalent metal or metals and may be regarded either as mixtures of molybdenum oxides with oxides of the polyvalent metal or metals, or as oxygen-containing compounds of molybdenum and the polyvalent metal or metals, such as antimony molybdate. Under the reaction conditions the catalyst may be present in both forms. In a preferred embodiment the catalyst should consist of the mixture of oxides and/or compound or compounds only without any additional catalytic material. Polyvalent metals may be for example vanadium, iron, cerium, [titanium,] antimony, tin, *and* tungsten [and bismuth]. The use of antimony and tin molybdate is particularly preferred. The catalyst may if desired be deposited on a support such as alumina or silica. The catalyst may be conveniently prepared, for example, by precipitation from mixed solutions of salts of the polyvalent metal or metals with molybdenum salts. For example, by adding an aqueous solution of an antimony salt to an aqueous solution or suspension of molybdic acid or a molybdic acid salt, and recovering the resulting precipitate; or adding the metal to boiling dilute nitric acid to form a white precipitate, filtering and washing the precipitate with water and mixing it with molybdic oxide and water to form a slurry which is then dried and formed into pellets. Alternatively the catalyst may be prepared by mere admixture of the desired polyvalent metal oxide or oxides with oxides of molybdenum. The catalyst is suitably given a heat treatment before use, for instance to a temperature between 500° and 1300° C.

The atom ratio of polyvalent metal to molybdenum in the catalyst may vary within moderately wide limits. It may be as high as 20:1 or as low as 1:6.5, and these ratios will apply irrespective of the specific polyvalent metal employed. These ratios are determined by the following mathematical calculation:

$$\frac{NmWm}{Mm} : \frac{NMbWMb}{MMb} = \text{Ratio of polyvalent metal to molybdenum}$$

In the expression:

Nm=number of atoms of polyvalent metal present in starting compound of oxide

Wm=starting weight of such compound or oxide

Mm=the molecular weight of such compound or oxide

NMb, WMb and MMb are the corresponding values for molybdenum.

The reaction may be carried out in any suitable manner, for instance as a fixed bed process, or as a fluidised bed process.

The proportion of aldehyde or compound producing aldehyde under reaction conditions, e.g. olefine, in the feed may vary within wide limits, for example between 1 and 20% by volume, and preferably between about 2 and 10% by volume.

The concentration of oxygen in the feed may also vary within moderately wide limits, for example between 1 and 20% by volume and preferably between 2 and 15% by volume. The oxygen may be diluted with inert gases, and may be, for example, supplied as air.

It is preferred to carry out the reaction in the presence, as diluent, of a gas which is substantially inert under the conditions of reaction, for example, nitrogen, propane, butane, isobutane, carbon dioxide or steam. It is preferred to use steam or nitrogen or mixtures thereof. The concentration of the steam may vary within wide limits, for instance between 20 and 60% by volume of the feed.

The reaction is carried out at an elevated temperature, preferably between 300° C. and 500° C.

The contact time may be, for example, in the range 1–30 seconds.

The unsaturated acid may be removed free from acrolein from the reaction gas mixture in any suitable manner, for example by extraction with a solvent such as water followed by fractional distillation of the resulting aqueous solution.

The process of the invention is further illustrated by the following examples. In the examples, parts are by weight and parts by volume bear the same relation to each other as do grams to milliliters.

[Example 1]

[A hot solution of 97 parts by weight of bismuth nitrate in dilute nitric acid (35 parts by weight of nitric acid specific gravity 1.42 mixed with 225 parts by weight of water) was added with stirring to a warm solution of 53 parts by weight of ammonium molybdate in 50 parts by weight of water containing a little ammonia. The mixture was boiled and the precipitate filtered off, washed with water and dried. The dry mass was broken down and the powder mixed with 2% of graphite and pelleted, the pellets then being heated at 540° C. for 16 hours. The bismuth to molybdenum atomic ratio in the catalyst is 1:1.5.

A gaseous mixture of 9.5% by volume of acrolein, 10.6% by volume of oxygen, 51.2% by volume of nitrogen, and 28.7% by volume of steam was passed over the catalyst in a reactor maintained at 400° C., the contact time being 3.2 seconds.

Of the total acrolein fed to the reactor, 8.7% was converted to acrylic acid, 7.5% to carbon dioxide and 71.3% was recovered unchanged.

The yield of acrylic acid based on acrolein consumed was 30.3%.]

[Example 2]

[A solution of 5 parts of bismuth nitrate in dilute nitric acid (4 parts of nitric acid S.G. 1.42 in 9 parts of water) was added to a warm solution of 12 parts of ammonium molybdate in 24 parts by water. 15 parts of 8–16 mesh B.S.S. kieselguhr was stirred into the pale yellow sludge, and the resulting solid was heated initially at 260° C. for 6 hours and then at 510° C. for 16 hours; the resulting catalyst was sieved to 8–16 mesh B.S.S. The bismuth to molybdenum atomic ratio in the catalyst is 1:6.5.

A gaseous mixture of 7.9% by volume of methacrolein, 11.8% by volume of oxygen, 44% by volume of nitrogen and 36.3% by volume of steam was passed over the catalyst maintained in a reactor at 367° C., the contact time being 4.0 seconds.

Of the methacrolein fed to the reactor 4.1% was converted to methacrylic acid, 1.9% to carbon dioxide and 84.1% was recovered unchanged.

The yield of methacrylic acid based on methacrolein consumed was 25.8%.]

Example [3] *1*

50 parts by weight of tungstic acid was stirred with a solution of ammonia (66 parts by weight of 0.880 ammonia mixed with 75 parts by weight of water) until no more tungstic acid dissolved. The mixture was filtered, and to the filtrate a solution of 35 parts by weight of ammonium molybdate in 50 parts by weight of water was added; dilute hydrochloric acid was then added to this mixture with stirring until precipitation was complete. The precipitate was filtered off, washed with water and dried, the dry mass being broken down to granules of 8 to 16 mesh B.S.S. The tungsten to molybdenum atomic ratio in the catalyst is 1:0.98.

A gaseous mixture of 10.4% by volume of acrolein, 10.2% by volume of oxygen, 49.6% by volume of nitrogen, and 29.7% by volume of steam was passed over the catalyst maintained in a reactor at 350° C., the contact time being 4.0 seconds.

Of the acrolein fed to the reactor 46.1% was converted to acrylic acid, 11.2% to carbon dioxide, and 18.6% was recovered unchanged.

The yield of acrylic acid based on acrolein consumed was 56.6%.

[Example 4]

[144 parts by weight of molybdic oxide and 79.9 parts by weight of titanium dioxide were mixed together with a little water to form a slurry, and the mixture then dried. The dry catalyst mass was broken down to pass a 30 mesh B.S.S. sieve, mixed with 2% of graphite and pelleted. The catalyst pellets were then heat treated at 600° C. for 16 hours. The titanium to molybdenum atomic ratio in the catalyst is 1:1.

A gaseous mixture of 10.2% by volume acrolein, 10.0% by volume of oxygen, 50.4% by volume of nitrogen and 29.4% by volume of steam was passed over the catalyst maintained in a reactor at 400° C. the contact time being 4.0 seconds.

Of the acrolein fed to the reactor 24.6% was converted to acrylic acid, 5.7% to carbon dioxide, and 51.1% was recovered unchanged.

The yield of acrylic acid based on acrolein consumed was 50.3%.]

Example [5] *2*

A solution of 132.4 parts by weight of ammonium molybdate in 500 parts of water was added dropwise to a solution of 217 parts by weight of cerous nitrate in 500 parts by weight of water with stirring. The precipitate was filtered off, washed with water and dried. The dry catalyst mass was broken down to pass a 30 mesh B.S.S. sieve, mixed with 2% of graphite and pelleted. The cerium to molybdenum atomic ratio in the catalyst is 1:1.5.

A gaseous mixture of 10.1% of acrolein, 10.0% by volume of oxygen, 49.8% by volume of nitrogen, and 30.1% by volume of steam was passed over the catalyst maintained in a reactor at 400° C. the contact time being 4.0 seconds.

Of the acrolein fed to the reactor 12.8% was converted to acrylic acid, 6.1% to carbon dioxide, and 65.0% was recovered unchanged.

The yield of acrylic acid based on acrolein consumed was 36.6%.

Example [6] *3*

A solution of 202 parts by weight of ferric nitrate ($Fe(NO_3)_3 \cdot 9H_2O$) in 500 parts by weight of water was mixed with a solution of 132.5 parts by weight of ammonium molybdate in 500 parts by weight of water. A precipitate was formed, and after a few minutes the mixture set to a green gel. The well stirred mass was then dried in an oven at 90° C. over 3 days and the solid residue sieved to pass a 30 mesh B.S.S. sieve. The powder was washed with water, dried, heated in air at 240° C. and then formed into pellets with 2% by weight of graphite. The pellets were heated at 600° C. for 16 hours. The iron to molybdenum atomic ratio in the catalyst is 1:1.3.

A gaseous mixture of 9.9% by volume of acrolein, 10.1% by volume of oxygen, 49.7% by volume of nitrogen, and 30.2% by volume of steam were passed over the catalyst maintained in a reactor at 400° C., the contact time being 4.0 seconds.

Of the acrolein fed to the reactor 8.7% was converted to acrylic acid, 13.7% to carbon dioxide, and 38.9% was recovered unchanged.

The yield of acrylic acid based on acrolein consumed was 14.2%.

Example [7] *4*

91 parts by weight of vanadium pentoxide and 144 parts by weight of molybdic oxide were intimately mixed by slurrying with water. The mixture was dried, and granulated by making into a paste with a 10% solution of ethanolamine, and drying. The catalyst mass was broken down to 7–16 mesh size B.S.S. sieves, and the granules were heated at 550° C. for 16 hours. The vanadium to molybdenum atomic ratio in the catalyst is 1:1.

A gaseous mixture of 9.8% by volume of acrolein, 10.1% by volume of oxygen, 50.3% by volume of nitrogen, and 29.8% by volume of steam was passed over the catalyst maintained in a reactor at 425° C., the contact time being 4.0 seconds.

Of the acrolein fed to the reactor 28.5% was converted to acrylic acid, 4.4% to carbon dioxide, and 40.5% was recovered unchanged.

The yield of acrylic acid based on acrolein consumed was 47.8%.

Example [8] *5*

A solution of 175 parts by weight of stannic chloride ($SnCl_4.5H_2O$) in 500 parts by weight of water was added slowly with stirring to a solution of 177 parts by weight of ammonium molybdate in 500 parts by weight of water. The precipitate formed was filtered, washed with water and dried. The solid mass was ground to pass a 30 mesh B.S.S. sieve, heated at 500° C. for 16 hours, pelleted with 2% graphite, and heated at 750° C. for 16 hours. The tin to molybdenum atomic ratio in the catalyst is 1:2.

A gaseous mixture of 10.1% by volume of acrolein, 10.1% by volume of oxygen, 50.3% by volume of nitrogen, and 29.5% by volume of steam was passed over the catalyst maintained in a reactor at 370° C., the contact time being 2.9 seconds.

Of the acrolein fed to the reactor 34.2% was converted to acrylic acid, 10.8% was converted to carbon dioxide, and 26.0% was recovered unchanged.

The yield of acrylic acid based on acrolein consumed was 46.2%.

Example [9] *6*

63 parts by weight of powdered tin metal were slowly added to a well stirred solution of 379 parts by weight of nitric acid (S.G. 1.42) dissolved in 1067 parts by weight of water. During addition the acid solution was maintained at its boiling point. When the addition was complete the mixture was boiled with stirring until no more brown nitrous fumes were evolved. The mixture was filtered, washed with distilled water and made into a thick slurry with a little water. 3.8 parts of powdered molybdic oxide were added and intimately mixed. The resulting mixture was dried, powdered and pelleted with 2% by weight of graphite. The catalyst was then heat treated at 750° C. for 16 hours, and subsequently at 1,000° C. for 16 hours. The tin to molybdenum atomic ratio in the catalyst is 20:1.

A gaseous mixture of 10.1% by volume of acrolein, 10.4% by volume of oxygen, 49.1% by volume of nitrogen and 30.4% by volume of steam was passed over the catalyst maintained in a reactor at 400° C. the contact time being 3.8 seconds.

Of the acrolein fed to the reactor 42.6% was converted to acrylic acid, 4.9% to carbon dioxide and 29.4% was recovered unchanged.

The yield of acrylic acid based on acrolein consumed was 60.4%.

Example [10] *7*

63 parts by weight of powdered tin metal were slowly added to well stirred solution of 267 parts by volume of nitric acid (S.G. 1.42) dissolved in 1067 parts by weight of water. During the addition the acid solution was maintained at its boiling point. When the addition was complete the mixture was boiled with stirring until no more brown nitrous fumes were evolved. The mixture was filtered, washed with distilled water and made into a thick slurry with a little water. 3.8 parts by weight of powdered molybdic oxide were added and mixed intimately. The resulting mixture was sucked dry on a filter and dried in an oven at 100° C. The dry solid was powdered, mixed with 2% by weight of graphite and pelleted. The actalyst was then heat treated at 750° C. for 16 hours and then at 1,000° C. for 16 hours. The tin to molybdenum atomic ratio in the catalyst is 20:1.

The catalyst was placed in a reactor maintained at 427° C. and a gaseous mixture of 10% by volume of propylene, 50% by volume of air and 40% by volume of steam was passed over the catalyst, the contact time being 4 seconds. Of the propylene fed 12.5% was converted to acrylic acid, 10.2% to acrolein and 5.1% to carbon dioxide. The yield of acrolein and acrylic acid based on propylene consumed was 57%.

Example [11] *8*

The catalyst prepared as described in Example 10 was placed in a reactor maintained at 400° C. and a gaseous mixture of 10% by volume of acrolein, 50% by volume of nitrogen, 10% by volume of oxygen and 30% by volume of steam was passed over the catalyst, the contact time being 3.8 seconds.

Of the acrolein fed 42.6% was converted to acrylic acid and 4.9% to carbon dioxide. The yield of acrylic acid based on acrolein consumed was 60.4%.

Example [12] *9*

An intimate mixture of 350 parts of antimony pentoxide and 160.6 parts of molybdenum trioxide was ground to pass a 30 mesh B.S.S. sieve. 25.5 parts of graphite were added and the preparation was pelleted and subsequently heat treated at 500° C. for 23 hours. The antimony to molybdenum atomic ratio in the catalyst is 2:1.

A gaseous mixture of 10.1% by volume of acrolein, 49.9% by volume of nitrogen, 10.0% by volume of oxygen, and 30.0% by volume of steam was passed over the catalyst maintained in a reactor at 350° C. The contact time being 4.0 seconds.

Of the acrolein fed to the reactor 16.2% was converted to acrylic acid, 1.6% to carbon dioxide and 61.3% was recovered unchanged.

The yield of acrylic acid based on acrolein consumed was 41.8%.

When the process was repeated at a reaction temperature of 400° C., 32.0% of the acrolein fed was converted to acrylic acid.

Example [13] *10*

An intimate mixture of 350 parts of antimony pentoxide and 160.6 parts of molybdenum trioxide was ground to pass a 30 mesh B.S.S. sieve. 25.5 parts of fine flake graphite were added, and the preparation was pelleted and subsequently heat treated at 500° C. for 23 hours. The antimony to molybdenum atomic ratio in the catalyst is 2:1.

57.8 parts of this catalyst was placed in a conventional oxidation reactor. A mixture of 4.4% by volume of methacrolein, 44.4% by volume of nitrogen, 5.2% by volume of oxygen and 46% by volume of steam was introduced into the reactor; the contact time was 4.1 seconds.

Of the methacrolein fed, 19.4mole percent was converted to methacrylic acid, and 7.4% to carbon dioxide. The yield of methacrylic acid based on methacrolein consumed was 41.2%.

[Example 14]

[A solution of chromium nitrate $Cr(NO_3)_3$, $9H_2O$ (400 parts by weight) dissolved in distilled water (500 parts by weight) was added to a solution of ammonium molybdate $(NH_4)_6Mo_7O_{24}$, $4H_2O$ (177 parts by weight) dissolved in distilled water (1000 parts by weight of 60° C. The mixture was brought to pH 6.6 by the addition of aqueous ammonia. The mixture was filtered and the solid washed once by resuspension for 15 minutes in distilled water (1000 parts by weight), and filtered. The cake was dried at 110° C. for 16 hours, broken down to pass 30 mesh (B.S.S.), mixed with graphite (1% by weight), pelleted and heated in air in a muffle furnace. The furnace temperature was programmed from 200° C. to 700° C. at 22° C. per hour and maintained at 700° C. for 16 hours. The chromium to molybdenum ratio is 1:1.

A gaseous mixture of 7% by volume of acrolein, 5% by volume of oxygen, 58% by volume of nitrogen and 30% by volume of steam was passed over the catalyst in a reactor maintained at 390° C., the contact time being 3 seconds.

Of the total acrolein fed to the reactor, 42% was converted to acrylic acid, 24% to carbon oxides and 27% was recovered unchanged.]

What is claimed is:

1. A process which comprises reacting in vapor phase at about 300°–500° C. an aldehyde selected from the group consisting of acrolein and methacrolein to produce the corresponding acid with molecular oxygen over an oxidation catalyst consisting essentially of (1) a mixture of an oxide of molybdenum and an oxide of a polyvalent metal selected from the group consisting of the oxides of vanadium, iron, cerium, [titanium,] antimony, tin, *and* tungsten [and bismuth] or (2) a compound of molybdenum, oxygen and said polyvalent metal; the atomic ratio of polyvalent metal to molybdenum being from 20:1 to 1:65; the percentage of feed substance in the reactant feed being from 1 to 20% by volume, the reactant feed containing from 1 to 20% by volume of oxygen, and the contact time being from 1 to 30 seconds.

2. A process as claimed in claim 1 wherein the catalyst consists of antimony molybdate.

3. A process as claimed in claim 1 wherein the catalyst consists of tin molybdate.

4. A process as claimed in claim 1 employing a supported catalyst.

5. A process as claimed in claim 4 wherein the catalyst is supported on alumina.

6. A process as claimed in claim 4 wherein the catalyst is supported on silica.

7. A process as claimed in claim 1 wherein the reactant feed contains between about 2 and 10% by volume of feed substance.

8. A process as claimed in claim 1 wherein the reactant feed contains between 2 and 15% by volume of molecular oxygen.

9. A process as claimed in claim 1 wherein the molecular oxygen is supplied in the form of air.

10. A process as claimed in claim 1 carried out in the presence of an inert diluent selected from the group consisting of nitrogen, propane, butane, isobutane, carbon dioxide, steam and mixtures thereof.

11. A process as claimed in claim 10 wherein the proportion of steam as inert diluent is between 2 and 60% by volume of the reactant feed.

12. A process as claimed in claim 10 wherein the inert diluent is nitrogen.

13. A process as claimed in claim 10 wherein the inert diluent is a mixture of steam and nitrogen.

*14. A process which comprises reacting in vapor phase at about 300°–500° C. an aldehyde selected from the group consisting of acrolein and methacrolein to produce the corresponding acid with molecular oxygen over an oxidation catalyst consisting essentially of (1) a mixture of an oxide of molybdenum and an oxide of tungsten or (2) a compound of molybdenum, oxygen and tungsten; the atomic ratio of tungsten to molybdenum being from 20:1 to 1:65; the percentage of feed substance in the reactant feed being from 1 to 20% by volume, the reactant feed containing from 1 to 20% by volume of oxygen, and the contact time being from 1 to 30 seconds.*

*15. A process which comprises reacting in vapor phase at about 300°–500° C. an aldehyde selected from the group consisting of acrolein and methacrolein to produce the corresponding acid with molecular oxygen over an oxidation catalyst consisting essentially of (1) a mixture of an oxide of molybdenum and an oxide of cerium or (2) a compound of molybdenum, oxygen and cerium; the atomic ratio of cerium to molybdenum being from 20:1 to 1:65; the percentage of feed substance in the reactant feed being from 1 to 20% by volume, the reactant feed containing from 1 to 20% by volume of oxygen, and the contact time being from 1 to 30 seconds.*

*16. A process which comprises reacting in vapor phase at about 300°–500° C. an aldehyde selected from the group consisting of acrolein and methacrolein to produce the corresponding acid with molecular oxygen over an oxidation catalyst consisting essentially of (1) a mixture of an oxide of molybdenum and an oxide of vanadium or (2) a compound of molybdenum, oxygen and vanadium; the atomic ratio of vanadium to molybdenum being from 20:1 to 1:65; the percentage of feed substance in the reactant feed being from 1 to 20% by volume, the reactant feed containing from 1 to 20% by volume of oxygen, and the contact time being from 1 to 30 seconds.*

*17. A process which comprises reacting in vapor phase at about 300°–500° C. an aldehyde selected from the group consisting of acrolein and methacrolein to produce the corresponding acid with molecular oxygen over an oxidation catalyst consisting essentially of (1) a mixture of an oxide of molybdenum and an oxide of iron or (2) a compound of molybdenum, oxygen and iron; the atomic ratio of iron to molybdenum being from 20:1 to 1:65; the percentage of feed substance in the reactant feed being from 1 to 20% by volume, the reactant feed containing from 1 to 20% by volume of oxygen, and the contact time being from 1 to 30 seconds.*

* * * * *

UNITED STATES PATENT OFFICE

CERTIFICATE OF CORRECTION

PATENT NO. : RE 28,593

DATED : October 28, 1975

INVENTOR(S) : JAMES ROBERT BETHELL ET AL

It is certified that error appears in the above-identified patent and that said Letters Patent are hereby corrected as shown below:

Col. 1, line 65 - "molybdate" should read --molybdates--

Col. 5, line 50 - After "During" insert --the--

Col. 6, line 18 - "actalyst" should read --catalyst-- line 31 - "Example 10" should read --Example 7--

Col. 8, line 14 - "2" should read --20--
(Claim 11)

Signed and Sealed this

*third* Day of *February 1976*

[SEAL]

*Attest:*

RUTH C. MASON
*Attesting Officer*

C. MARSHALL DANN
*Commissioner of Patents and Trademarks*